L. T. BULLEY.

SHADE ROLLER.

APPLICATION FILED JAN. 4, 1910.

Reissued Apr. 19, 1910. 13,103.

WITNESSES:

S. Thurmond

L. L. Williams

INVENTOR

Louis T. Bulley

BY

Francis Chambers his ATTORNEY.

UNITED STATES PATENT OFFICE.

LOUIS T. BULLEY, OF WATERBURY, CONNECTICUT.

SHADE-ROLLER.

13,103. Specification of Reissued Letters Patent. Reissued Apr. 19, 1910.

Original No. 808,722, dated January 2, 1906, Serial No. 232,799. Application for reissue filed January 4, 1910. Serial No. 536,436.

*To all whom it may concern:*

Be it known that I, LOUIS T. BULLEY, a citizen of the United States, residing at Waterbury, county of New Haven, and State of Connecticut, formerly of New Haven, county of New Haven, and State of Connecticut, have invented certain new and useful Improvements in Shade-Rollers, of which the following is a specification, reference being had therein to the accompanying drawings.

My invention relates to new and useful improvements in shade-rollers, and has for its object, among other things, the production of a device of this character that will be positive in its operation and constructed of few parts so designed as to be readily assembled and manufactured at the minimum cost.

To these and other ends my invention consists in the shade-roller having certain details of construction and combination of parts, as will be hereinafter described, and more particularly pointed out in the claims.

Figure 1:
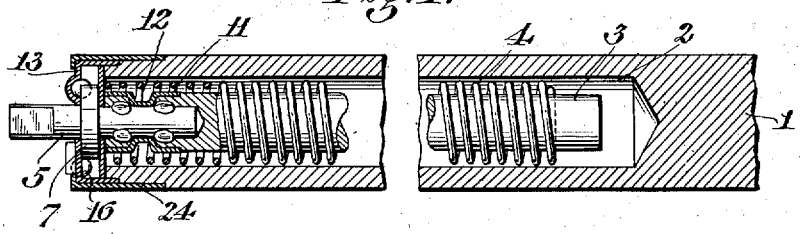
Figure 3:
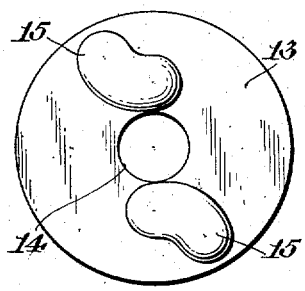
Figure 2:
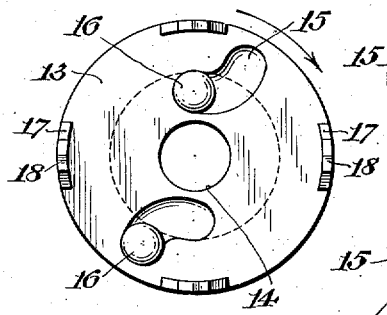
Figure 4:
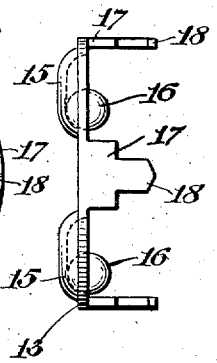
Figure 5:
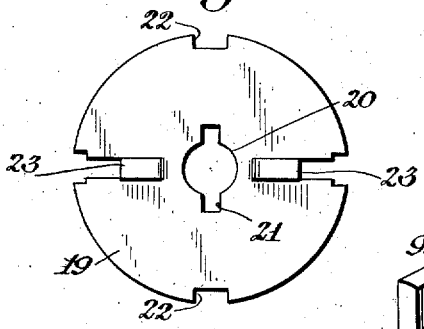
Figure 7:
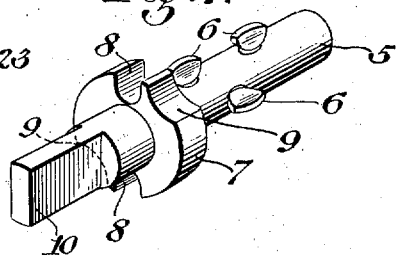
Figure 6:
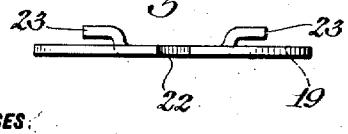

Referring to the drawings, in which like numerals of reference designate like parts in the several figures, Figure 1 is a longitudinal sectional view of a shade-roller. Fig. 2 is a view of the cam plate from the inside. Fig. 3 is a view thereof from the outside. Fig. 4 is a side elevation thereof. Fig. 5 is a front elevation of the spring disk. Fig. 6 is a side elevation thereof, and Fig. 7 is a perspective view of the spear bar.

In carrying out my invention I provide the usual roller 1, to which the curtain is affixed in any of the many ways common to the art and having a hole 2 in the end thereof, within which is held the spring rod 3, having the coil spring 4 affixed thereto at its inner end, as shown in Fig. 1. Driven into the end of the spring rod 3 is the spear bar 5, which is provided with a plurality of radially projecting wings 6, which prevent the rotation of said bar within said rod. (See Fig. 1). Midway of the length of said spear-bar is the collar 7, having diametrically-opposed notches or ball receiving pockets 8 therein, and in the periphery of said collar adjacent to the said recesses and diametrically opposite each other are the recesses 9. The outer end of said spear bar is flattened at 10, so as to enter the slot in the curtain bracket, as is usual, to prevent the rotation of said spear bar, and the spring attached thereto. For further security and to prevent the splitting of the spring bar 3 and the withdrawal of the spear bar therefrom I provide a ferrule 11, which encircles the said spring bar and is provided with one or more detents 12 between the wings 6.

The cam plate is designated 13 and is preferably formed of a circular flat body having a hole 14 through the center thereof of substantially the same diameter as the end of the spear bar which passes therethrough and having diametrically opposed cam recesses or ball ways 15, each of which recesses is rounded at both ends and has concentric sides of the same width and diameter as the balls 16, which run therein. Each cam recess or ball way 15 comprises an inner portion adapted to register laterally with the notches or pockets 8, and an outer portion beyond the periphery of the collar 7. Projecting inwardly and at right angles to said body portion and preferably integral therewith are a plurality of lugs 17, each of which is provided with a prong 18. The spring plate 19 is of substantially the same diameter as the cam plate 13, being provided also with a hole 20 through the center thereof of the same diameter as the shank 5 of the spear bar and having radial notches 21 therein to permit the wings 6 to pass therethrough. Said spring plate is provided upon each of its sides with a peripheral notch 22 of substantially the same width as the prongs 18, and projecting laterally from either side of said plate are the clips 23, between which and said plate the end of the coil spring 4 is secured.

The several parts of my invention are assembled as shown in Fig. 1—that is, the spring plate 19 is first placed upon the spear bar and the shank thereof driven into the end of the rod 3 after the ferrule 11 has been placed upon the end thereof. The detents 12 are then formed in the ferrule between the ears 6. The spring 4 is affixed by securing one end to the inner end of the rod 3 in any preferred manner and the outer end beneath one or both of the clips 23. The cam plate is then placed in position with a ball in each one of the cam-recesses 15, the prongs 18 passing through the notches 22 and driven into the end of the roller, after which the ferrule 24, having the inwardly turned lip at its outer end, is placed in position and completing the assembling operation.

In Fig. 2 I have illustrated the peripheral line of the collar 7 by broken lines, and it will be there noted that one of the balls 16 is in the upper of the two notches 8 and in that end of the cam-recess 15 nearest the center, while the other of the balls 16 is occupying that end of the cam-recess 15 nearest the periphery of the cam and out of engagement with said collar. When the parts are in the position just described, the roller is stationary and at rest. To actuate the same, the curtain is drawn down with a slight steady pull, which rotates the cam plate about the spear and causes the upper ball 16 to ride upon the edge of the cam recess 15, which lifts it out of the notch 8 and breaks the rigid connection between the cam plate and roll and the spear bar and its adjacent parts. The curtain may now be moved by causing the same to travel at a speed sufficiently great to throw the balls with centrifugal force to the outer end of the recess 15, in which position they will travel around the collar 7 without engaging any of the notches therein. As soon as the curtain has been brought to the desired position and its movement is checked, the upper of the balls 16 will drop by gravity to the lower end of the cam recess 15 and when the same registers with the upper of the notches 8 will cause the same to enter therein, thus locking the parts together and preventing the further rotation of the roller. During the rotation of the cam plate if the same is not being rotated with uniform and the requisite speed the balls will have a tendency when the cam recesses are in their uppermost positions to roll down through said cam-recesses and into the upper notch 8, and to overcome this tendency and to insure the operation of the device without moving the curtain at the extreme speed I have provided the peripheral recesses 9, which are adjacent to the notches 8. In operation as the balls 16 roll down through the cam recesses 15 and strike the recesses 9 they ride out of said recesses and are thrown up into the cam recesses 15 a sufficient distance to permit the cam recesses 15 to pass the notch 8 before gravity overcomes the movement of the ball and draws it toward the center.

There are many minor changes and alterations that can be made within my invention aside from those herein suggested, and I would therefore have it understood that I do not limit myself to the exact construction herein shown and described, but claim all that falls fairly within the spirit and scope of my invention.

Having described my invention, what I claim as new, and desire to secure by Letters Patent, is:

1. In a shade roller, the combination with a roller, of a spring bar mounted therein, a spear bar fixed to said spring bar and having a notched collar thereon; a cam-plate fixed to the end of said roller, said cam plate having a substantially L shaped cam recess therein, a ball operative therein, and means, as a plate, for preventing the accidental displacement of said ball.

2. In a shade roller, the combination with a roller, of a spring bar mounted therein, a spear bar fixed within the end of said spring bar and having a collar thereon provided with a notch having parallel sides and a recess in the periphery thereof, a cam plate having a substantially L shaped cam recess therein, a ball movably mounted within said cam recess, and a plate opposite said cam plate.

3. The combination with the spear bar, having a collar thereon provided with a radial notch and a peripheral recess adjacent to said notch, of a cam plate, having a substantially L shaped cam depression therein, said cam depression being rounded at both ends and having sides concentric with each other, a ball within said cam depression of substantially the same diameter as the width thereof, and a plate opposite said cam plate.

4. The combination with a spear bar 5, having the collar 7 thereon provided with a notch having parallel sides and a peripheral recess adjacent to said notch, a cam plate 13, having a substantially L shaped cam depression 15 therein, a ball 16 operative within said depression, and a plate 19 opposite said cam plate.

5. In a shade roller, the combination with a roller, of a spring bar mounted therein, a spear bar fixed within the end of said spring bar and having a collar thereon provided with a notch in the periphery thereof; a cam plate having a cam recess therein, which during its rotation passes the bottom of the recess in said collar, a ball within said cam recess, and a plate opposite said cam plate.

6. In a shade roller, the combination with a roller, of a spring bar mounted therein, a spear bar fixed within the end of said spring bar and having a collar thereon provided with a parallel sided notch in the periphery thereof; a cam plate upon one side of said collar having a cam recess therein, which during a portion of its rotation registers with the recess in said collar, a ball within said cam recess, and a plate upon the side of said collar opposite said cam plate.

7. In a shade roller, the combination, with the roller proper, of a cam plate secured thereto, a spring bar, a spear head fixed to said bar and provided with a collar at the side of the cam plate and formed with a ball receiving pocket open at its outer end and open at the side toward the cam plate, said cam plate being formed with a cam ball way comprising an inner portion adapted to register laterally with the pocket in the collar and an outer portion beyond the periphery of the collar, a ball working in said cam plate ball way and adapted when in the inner portion thereof to project into the collar pocket and couple the collar and cam plate together, said shade roller having provisions for preventing axial displacement of the ball from the cam plate ball way.

LOUIS T. BULLEY.

Witnesses:

JAMES A. WYNER,

N. H. COX.